(12) United States Patent
Mann

(10) Patent No.: US 6,629,071 B1
(45) Date of Patent: Sep. 30, 2003

(54) SPEECH RECOGNITION SYSTEM

(75) Inventor: Robert James Mann, Romsey (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/552,847

(22) Filed: Apr. 20, 2000

(30) Foreign Application Priority Data

Sep. 4, 1999 (GB) .............................................. 9920844

(51) Int. Cl.[7] .............................................. G10L 15/22
(52) U.S. Cl. ...................................... 704/251; 704/254
(58) Field of Search .............................. 704/231, 251, 704/252, 254, 255, 257, 270, 275; 379/88.01, 88.03

(56) References Cited

U.S. PATENT DOCUMENTS

| | | | | |
|---|---|---|---|---|
| 5,651,056 A | * | 7/1997 | Eting et al. | 379/88.01 |
| 5,890,117 A | * | 3/1999 | Silverman | 704/258 |
| 6,078,885 A | * | 6/2000 | Beutnagel | 704/231 |
| 6,167,118 A | * | 12/2000 | Slivensky | 379/88.03 |
| 6,223,158 B1 | * | 4/2001 | Goldberg | 704/252 |
| 6,321,196 B1 | * | 11/2001 | Franceschi | 704/231 |
| 6,400,805 B1 | * | 6/2002 | Brown et al. | 379/88.01 |

FOREIGN PATENT DOCUMENTS

| | | |
|---|---|---|
| GB | 2280820 | 2/1996 |
| GB | 2304957 | 3/1997 |
| WO | WO96/25733 | 8/1996 |

* cited by examiner

*Primary Examiner*—Marsha D. Banks-Harold
*Assistant Examiner*—Martin Lerner
(74) *Attorney, Agent, or Firm*—Akerman Senterfitt

(57) ABSTRACT

The invention relates to a large vocabulary speech recognition system with the ability to recognize alphanumeric sequences. The recognition system prompts the caller to spell out an alphanumeric sequence in the form "letter for word" (eg A for Apple) and then uses the first letter of the word in combination with the detected letter to determine the alphabetic character being spelt out. Once the complete sequence has been spelt out, it is played back for confirmation.

4 Claims, 3 Drawing Sheets

SPEECH RECOGNITION SYSTEM

FIELD OF THE INVENTION

The present invention relates to speech or voice recognition systems, and more particularly to speech recognition systems for use in voice processing systems and the like.

DESCRIPTION OF THE RELATED ART

Voice processing systems whereby callers interact over the telephone network with computerised equipment are very well-known in the art, and include voice mail systems, voice response units, and so on. Typically such systems ask a caller (or called party) questions using prerecorded prompts, and the caller inputs answers by pressing dual tone multiple frequency (DTMF) keys on their telephones. This approach has proved effective for simple interactions, but is clearly restricted in scope due to the limited number of available keys on a telephone. For example, alphabetical input is particularly difficult using DTMF keys.

There has therefore been an increasing tendency in recent years for voice processing systems to use voice recognition in order to augment DTMF input. The adoption of voice recognition permits the handling of callers who do not have a DTMF phone, and also the acquisition of more complex information beyond simple numerals from the caller.

As an illustration of the above, WO96/25733 describes a voice response system which includes a prompt unit, a Voice Activity Detector (VAD), and a voice recognition unit. In this system, as a prompt is played to the caller, any input from the caller is passed to the VAD, together with the output from the prompt unit. This allows the VAD to perform echo cancellation on the incoming signal. Then, in response to the detection of voice by the VAD, the prompt is discontinued, and the caller input is switched to the recognition unit, thereby providing a barge-in facility.

Voice recognition in a telephony environment can be supported by a variety of hardware architectures. Many voice processing systems include a special DSP card for running voice recognition software. This card is connected to a line interface unit for the transfer of telephony data by a time division multiplex (TDM) bus. Most commercial voice processing systems, more particularly their line interface units and DSP cards conform to one of two standard architectures: either the Signal Computing System Architecture (SCSA), or the Multi-vendor Integration Protocol (MVIP). A somewhat different configuration is described in GB 2280820, in which a voice processing system is connected via a local area network to a remote server, which provides a voice recognition facility. This approach is somewhat more complex than the TDM approach, given the data communication and management required, but does offer significantly increased flexibility.

Speech recognition systems are generally used in telephony environments as cost-effective substitutes for human agents, and are adequate for performing simple, routine tasks. It is important that such tasks are performed accurately otherwise there may be significant customer dissatisfaction, and also as quickly as possible, both to improve caller throughput, and also because the owner of the voice processing system is often paying for the call via some FreePhone mechanism (eg an 800 number).

Speech recognition systems are most successful in environments where voice input is restricted to a small and limited vocabulary. Call centres, for example, typically prompt for single digit input in order to route their customers to the appropriate department. I.e. "Please say One for Technical Support, Two for Sales, Three for Customer Services" and so on. Here, the customer must respond with one of three choices and thus the margin for error is greatly reduced.

With continuing improvements in recognition accuracy however, the large vocabulary speech recognition systems which have been developed are starting to be used in more and more complex situations, which have hitherto been the exclusive realm of human operators. Nevertheless, even with their impressive ability to recognise speech, such systems are still deficient at providing as complete a service to the caller as a human agent could manage.

The recognition of proper names, surnames and place names, which are often outside the recognition system's dictionary still prove a significant challenge for such systems. Unusual or varied pronunciations further exacerbate the problem. Speech recognition systems may, for example, typically be required to recognise a customers first and surnames and to take down their address correctly. It is just not possible for these systems to cater for the wide variety of responses which they may encounter when requesting such information.

One possibility is to ask a caller to spell any unrecognised words. A person living in "Harestock",for example might be asked to spell out H A R E S T O C K. Unfortunately, this solution in itself has its problems. Many of letters in the alphabet have very similar pronunciations. S and F; B and P; and M and N are just a few examples of those which may easily be confused. Indeed this difficulty applies to both humans and speech recognition systems.

The need to recognise alphabetic letters occurs not only in the spelling of words which cause problems, but also single/sequences of alphabetic character(s) when the caller is asked to give information such as car registration numbers, catalogue references etc. It may be difficult to distinguish, for example, whether a car registration is actually M799 ABM or N799 APN. Incidentally numeric digits prove far easier to identify than alphabetic characters since there are fewer possibilities and they are acoustically more distinct.

It is known in certain environments (e.g. radio communications) to try to avoid such confusion by using the Intentional Civil Aviation Organization Phonetic Alphabet (ICAO), whereby alphabetic characters are associated with certain words: A for Alpha, C for Charlie, T for Tango etc. In this case, each letter can be recognised simply by listening to its corresponding word. However, this approach is difficult for commercial speech recognition systems since the general public will often not know the ICAO. Furthermore, this is not the only phonetic alphabet in existence. For instance, there are three different versions in use in the United States. Someone in the military a number of years ago, for example, might use "A for Able" rather than "A for Alpha".

SUMMARY OF THE INVENTION

Accordingly, the invention provides a method of performing speech recognition to determine a particular alphabetic character, comprising the steps of: a) receiving acoustic spoken input comprising a single alphabetic character and a word associated with the single character such that the first character of said word is intended to be the same as said single alphabetic character; b) processing said acoustic input by using a large speech vocabulary recognition system to recognise said single alphabetic character and said word; c) determining the first character of said recognised word; d) comparing the recognised single alphabetic character with the determined first character of said recognised word; and e) responsive to said recognised single alphabetic character being the same as said first character of the recognised word, accepting said character as the determined alphabetic character for the spoken input.

Such a method finds particular applicability when prompting for alphanumerics (eg car registration numbers, catalogue references etc). In this situation, the system is only required to recognise a discrete set of letters (ie from a set of twenty-six), but similarities in sound between some characters may cause difficulty. However, rather than seeking to improve the recognition performance per se of a discrete word recognition system, the invention adopts a different strategy. Thus by using a large vocabulary recognition system and associating a word with an alphabetic character, this difficulty is overcome. The large vocabulary recognition system allows the word to be an essentially arbitrary one so there is no reliance upon a user having familiarity with a particular phonetic alphabet. Although it is more expensive to use a large vocabulary system for dealing with a discrete set of letters, this is compensated for by an improved quality of speech recognition.

In the preferred embodiment both the single alphabetic character and the first character of the word must be recognised and must match one another for the alphabetic character of the spoken input to be determined. This approach offers improved recognition by using both elements to ensure that the correct alphabetic character is accepted, thereby providing an efficient method of error checking. If the single alphabetic character does not match the first character of the recognised word the system can take appropriate action, such as re-prompting for further input.

An alternative embodiment may accept the single alphabetic character even if the word has not been recognised. Conversely, if only the word is recognised the system may just use the first character of the word and accept this. However, this approach is more prone to inaccuracies since there is no error checking involved. A slight improvement on this can be achieved by the system maintaining a list of alphabetic characters which are not easily confused (eg K, X, Y and Z) and if only the single alphabetic character is recognised and this appears on the list then the system uses this character to determine the alphabetic character for the spoken input. Obviously the converse could be used—ie the system maintains a list of ambiguous alphabetic characters and does not accept the single alphabetic character as the spoken input if it appears on this list. This approach is more robust and avoids re-prompting for spoken input when the character initially input is distinct enough to be reliably recognised by itself.

Another possibility is for the system to store a history of successive unsuccessful matches and in this way it can identify any repeated inconsistencies and make an educated guess. If, for example, the first letter of the word is consistently the same, then it may assume that it is mistaking the single alphabetic character and choose to disregard this element. This again avoids unnecessary re-prompting and allows the system to use previously received information in order to make an intelligent decision.

Rather than accepting input in the form "letter for word", the system may accept a word only. In this situation the first character of the word denotes the alphabetic character being spelt out. This approach however is not particularly natural for the user and does not provide any form of error checking.

In the preferred embodiment, the method is implemented using a speech recognition system which is incorporated into a voice processing system connected to a telephone network. The spoken Input is received from a caller over this network. Typically whole alphanumeric strings are received, spelt out character by character. Audible notification (e.g. a beep) indicates the successful recognition of each character and once the whole string has been spelt out, it can be played back for confirmation. Alternatively, each character may be played back and confirmation requested before receiving the next character string. Such confirmation may, for example, be indicated by the caller pressing a DTMF key or providing some form of audible acceptance. Another possibility is for confirmation to be indirect, i.e. assumed when the next character in the string is received as input rather than some DTMF key, Either approach provides an additional check to ensure that the system is accepting the correct information.

In a further aspect the invention provides apparatus for performing speech recognition to determine a particular alphabetic character, comprising: a) means for receiving acoustic spoken input comprising a single alphabetic character and a word associated with the single character such that the first character of said word is intended to be the same as said single alphabetic character; b) a large speech vocabulary recognition system for processing said acoustic input for recognising said single alphabetic character and said word; c) means for determining the first character of said recognised word; d) means for comparing the recognised single alphabetic character with the determined first character of said recognised word; and e) means, responsive to said recognised single alphabetic character being the same as said first character of the recognised word, for accepting said character as the determined alphabetic character for the spoken input.

In a yet still further aspect, the invention provides a computer program product comprising program code stored on a computer readable storage medium for, when executed on a computer, performing speech recognition to determine a particular alphabetic character, by executing the steps of: a) receiving acoustic spoken input comprising a single alphabetic character and a word associated with the single character such that the first character of said word is intended to be the same as said single alphabetic character; b) processing said acoustic input by using a large speech vocabulary recognition system to recognise said single alphabetic character and said word; c) determining the first character of said recognised word; d) comparing the recognised single alphabetic character with the determined first character of said recognised word; and e) responsive to said recognised single alphabetic character being the same as said first character of the recognised word, accepting said character as the determined alphabetic character for the spoken input.

BRIEF DESCRIPTION OF THE DRAWINGS

An embodiment of the invention will now be described in detail by way of example only with reference to the following drawings.

DETAILED DESCRIPTION

Figure 1:
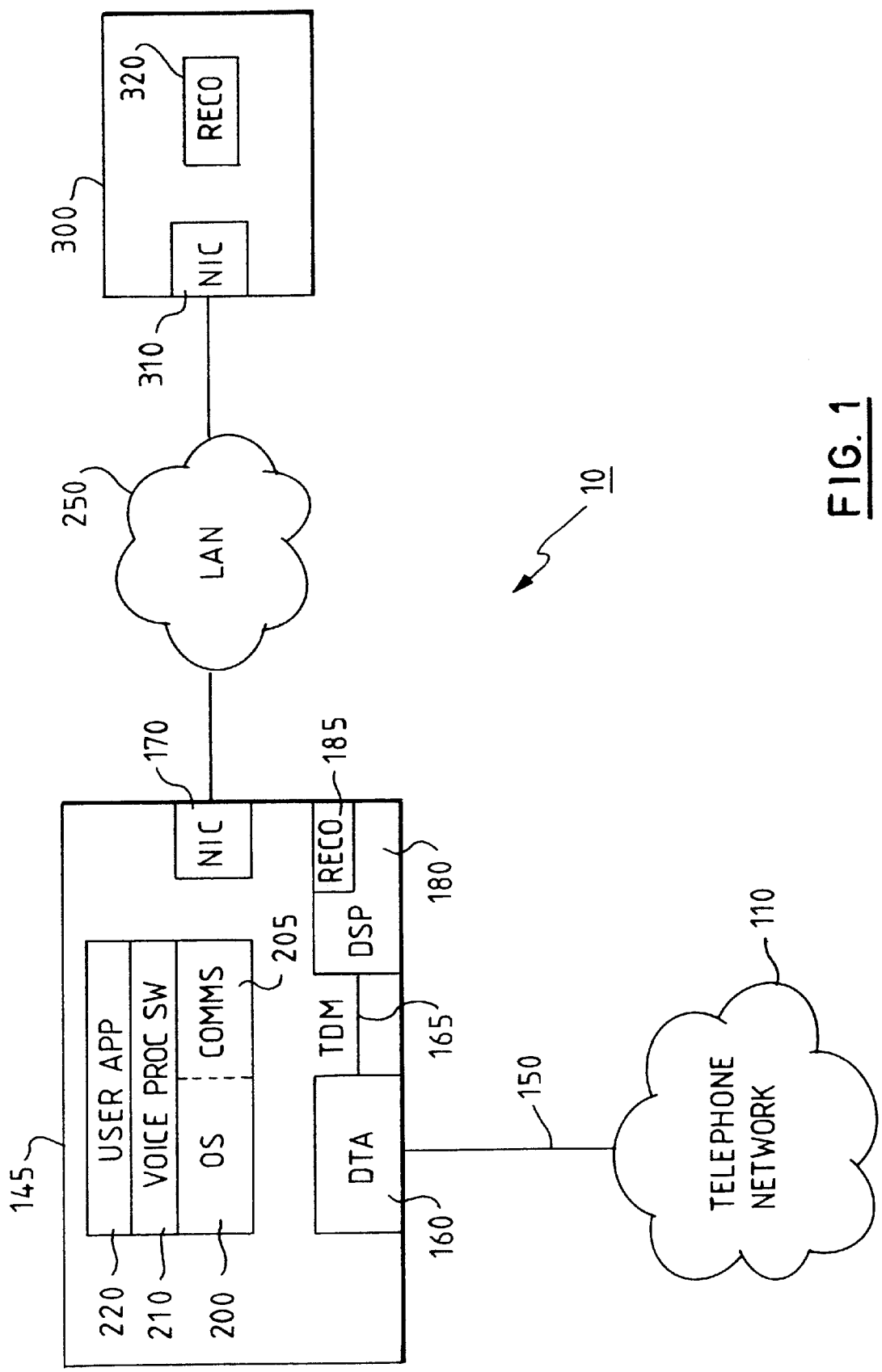
FIG. 1 is a simplified schematic diagram of a voice processing system connected to a remote server.

FIG. 1 illustrates in simplified schematic form the main hardware and software components of a voice processing system 10 having speech recognition functionality. The system 10 is connected to the telephone network 110 by one or more telephony channels 150. In FIG. 1 these are digital trunk lines, each carrying multiple telephony channels (T1 digital trunk lines in North America comprise 24 channels, E1 digital trunk lines in Europe comprise 30 channels). It will be appreciated that in some installations, the digital trunk lines may be connected to the telephone network 110 via a switch or PBX; indeed one possibility is for the voice processing system to effectively be a part of the telephone network itself, providing intelligent services to the network.

The system unit 145 of the voice processing system comprises a computer workstation, which runs an appropriate operating system 200 and a voice processing program 210, which in turn interacts with a user application 220 in order to determine how calls should be processed. The system unit includes one or more digital trunk adapter cards 160 for interfacing to the telephone network 110 via link 150. The system unit also contains a network interface card 170 which allows programs running on the workstation to communicate over a local area network (LAN) 250, using communications software 205 incorporated into the operating system. In addition, the system unit includes a digital signal processing (DSP) card 180, which is connected to the trunk adapter (or adapters) via a time division multiplex (TDM) bus 165. Speech recognition software 185 is installed on the DSP card.

The adapter cards 160 are responsible for interfacing with the telephone network over their respective lines, including signalling, demultiplexing incoming telephony signals, and so on. They may also be used to perform activities such as detection of voice activity on a particular telephony channel, compression/decompression of voice signals, and DTMF recognition, although these may be performed on the DSP card instead.

A server system 300 is attached to the LAN 250 via network interface card 310, and supports an operating system and appropriate communications software (not shown), and speech recognition software 320. It will be appreciated therefore that there are two voice recognition resources available to the application 220, the first of these being locally installed on the DSP card 180 in the system unit, and the second voice recognition resource being available remotely via the LAN 250 on server 300.

In one preferred embodiment, the voice processing system is the Corepoint Voice Response unit (previously known as the DirectTalk voice processing system) available from the IBM Corporation, running on an RS/6000 workstation on top of the AIX operating system. The voice recognition (VR) resource comprises a large vocabulary voice recognition system and may, for example, be the ViaVoice engine, available from IBM Corporation. PC-based systems are also available.

It will be appreciated that there are many possible variations in the design of the voice processing system of FIG. 1. For example, some voice processing systems accept input from analog lines rather than digital trunks, whilst some voice processing systems package the DSP card 185 as a daughter card of the DTA 160, thereby eliminating the need for the TDM bus. The illustrated system also has access to both a server voice recognition system, and also to a local DSP recognition system, whereas many voice processing systems will have access to only one such resource. Further, any suitable network could be used for communications between the server and the voice processing system, providing it has suitable transmission characteristics in terms of bandwidth and latency (eg one possibility might be to use an ATM connection). In addition, although the voice processing system illustrated has just a single local DSP resource, some voice processing systems may include multiple DSP cards, with each card supporting multiple recognition programs running simultaneously. Moreover, although the server approach as shown has the recognition system installed on a separate machine from the line interface unit 160, it would clearly be possible for the software recognition system to be running on the same machine 145 as the line interface unit, provided this machine had sufficient processing capability. The skilled person will appreciate that such variations are not pertinent to the principles of the present invention.

A typical operation of the voice processing system of FIG. 1 is as follows. An incoming call is received over the telephony network 110, and the voice processing system 10, under the control of the user application 220, may determine that the caller does not have a DTMF telephone (this determination can be made for example through knowledge of the calling or called number, or by the caller failing to depress a tone key when requested to do so). In such circumstances (or possibly for all callers), the voice processing system elects to utilise voice recognition to interpret the callers input This is done by forwarding the appropriate audio signal to a speech recognition resource. For use of the local resource, this leads to a channel on the trunk adapter 160 being connected with a channel on the DSP card 180 via the TDM bus 165. Access to the remote resource can be achieved for example using the approach described in GB2325110, which is incorporated herein by reference. (Note that the TDM bus connection as shown in FIG. 1 provides a unidirectional data flow, so that as is well-known in the art, a pair of such connections are needed to support a full duplex telephone conversation).

The speech recognition system processes the received audio signal, and returns the spoken string to the user application 220. It will be noted that the large majority of voice recognition systems used in telephony are speaker independent; in other words, such systems are trained to recognise vocal input from any speaker. This is accomplished by training the machine on vocal samples from as wide a range of speakers as possible. In general the recognition may also return other information in addition to the recognised string, for example, a statistical confidence level, possible alternative results, and so on. The user application will then further process the call in accordance with the returned recognition result. For example, if the caller has spoken a numerical sequence corresponding to an account number, it may then provide the caller with the ability to access account information; if the caller has spoken a particular name, it may transfer the caller to the telephone extension for that name. If the recognition response has a low confidence, the system may play the response back to the caller (eg using a text to speech system), and ask for confirmation that this was what the caller really said, whilst if the recognition fails completely, the caller may be asked to repeat the input, or transferred to a human operator.

Figure 2:
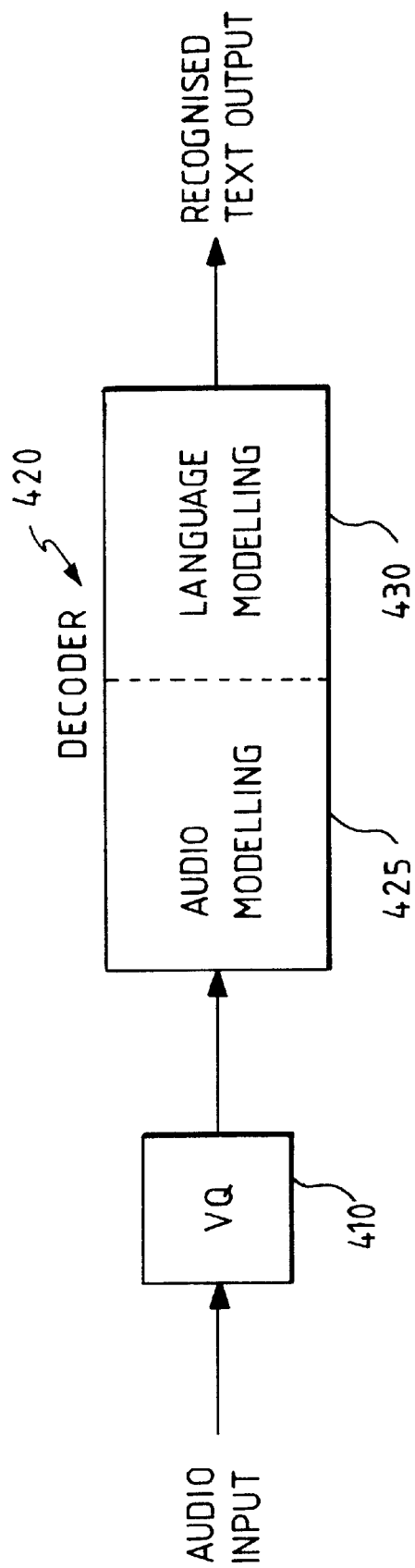
FIG. 2 is a simplified schematic diagram of a voice recognition system.

FIG. 2 illustrates a simple schematic diagram of a typical voice recognition system such as might be used in the voice processing system of FIG. 1. Thus the recognition system receives digitised audio input, which in the case of a telephone signal will generally comprise 8 bit samples at 8 kHz (corresponding to a total data rate of 64 kbit/s). These samples are passed to a vector quantisation unit 410, which aggregates them into vectors of typically 10 ms duration (ie 80 samples per vector). The vector quantisation unit may be supplied with a so-called alphabet of vectors (known as labels), and replaces each input vector with the label which matches it most closely. Typically there may be about 200 such labels in the vector quantisation alphabet. (NB Some more complex recognition systems do not in fact perform any vector quantisation, but work with the raw input vectors rather than a limited set of labels).

The audio input, now represented as a sequence of vector labels, is then passed into a decoder unit 420, which is responsible for converting this sequence into recognised text. The decoder functionality can be broken down into main components, audio modelling 425, and language modelling 430. The purpose of the audio modeller is to produce a variety of candidate word strings which may match the input sequence of vector labels; the purpose of the language modeller is then to select which of these word strings is the overall best fit to the audio input.

The mathematical basis for this approach is that if A is the audio input, and W the word output, for a given A, we are seeking to find W such that $P(W|A)$ is maximized. Using Bayes' theorem, this can be re-written as $\max(P(W).P$ (A|W)/P(A)), and since P(A) is constant for a given observed A, then the problem becomes the maximisation of P(W).P(A|W). Thus the purpose of the audio modeller is effectively to calculate P(A|W) (the probability of producing the observed audio signal from a given word), and the purpose of the language modeller is effectively to calculate P(W) (the a priori likelihood of a candidate word string produced by the audio modeller). The combination of P(A|W) and P(W) can then be used to determine which candidate word string is most likely to correspond to the speech input on an overall basis.

A language modeller typically looks at the likelihood of particular words appearing next to one another in spoken text, which can be used amongst other things to help decide between homophones (different words sounding the same); "new car" is in general much more likely than "knew car". However, in a telephony context, language modelling is often absent, because systems are generally looking to decode just single words, or constrained sequences of words (eg numerals). In most telephony applications the recognition system must actually interpret the input (ie understand it enough to follow an appropriate course of action), rather than simply turn it into text, as for example in a dictation system. Clearly it is much easier for the system to interpret single word or short inputs, rather than trying to unravel a complete input sentence. Therefore, most telephony applications make use of menu hierarchies, so that the context of any user response is readily apparent.

Figure 3:
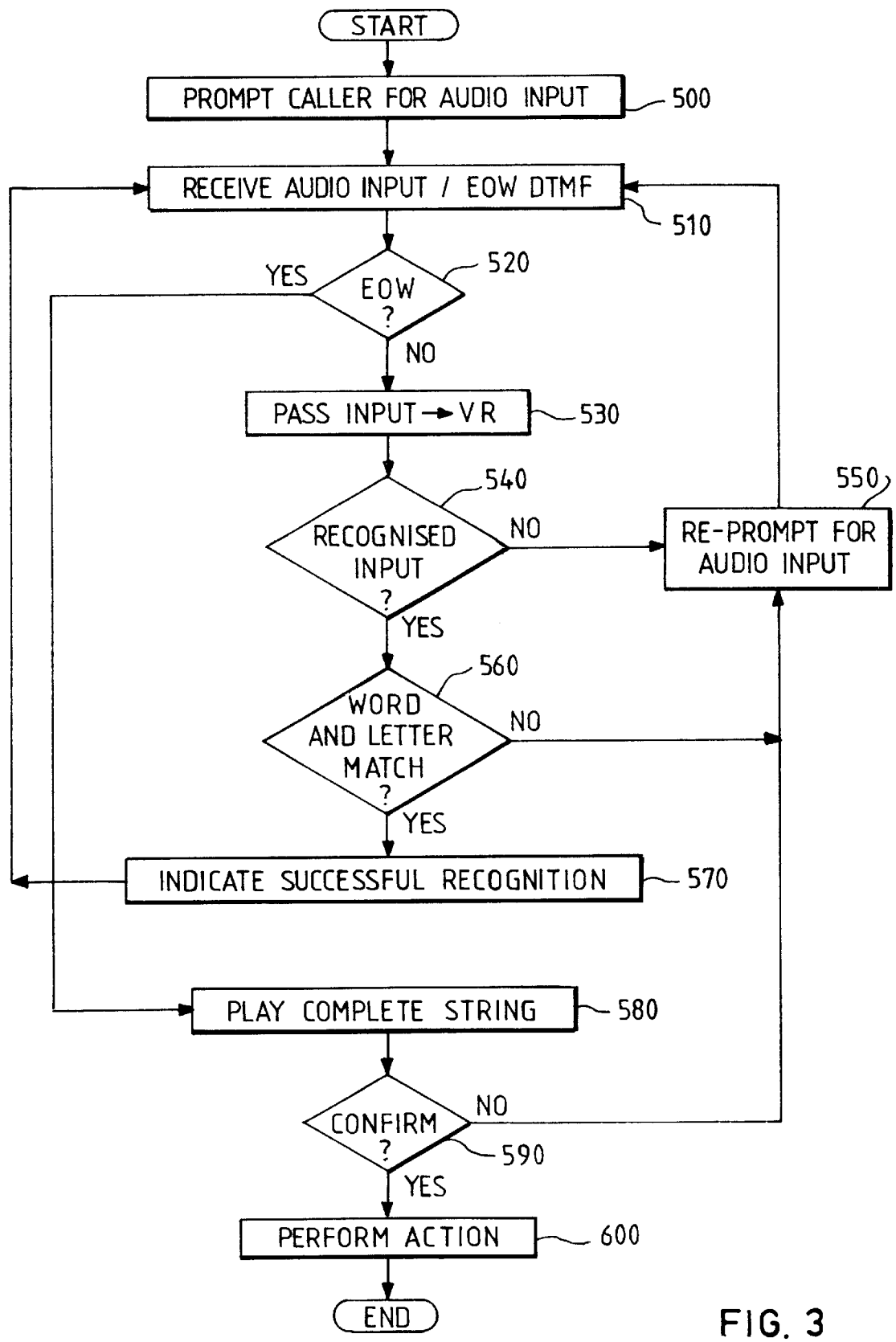
FIG. 3 is a flow diagram illustrating the operation of the present invention according to a preferred embodiment.

FIG. 3 illustrates the processing performed, in accordance with a preferred embodiment of the present invention, by the voice processing system of FIG. 1. A telephony application plays a plurality of prompts to a caller and the system typically navigates through a series of menu hierarchies in accordance with the caller's responses. At some stage, the caller is prompted to spell out their input letter by letter (step 500). This is typically due to a failed attempt to recognise a word or when requesting information likely to fall outside the speech recognition system's vocabulary. At this point, guidance is given indicating the required format for a response. The system may prompt, for example, "Please spell out the name of the town in which you live in the form of 'letter for word', eg A for Apple. You will hear a beep after each letter has been successfully recognised. Press the hash key when you are finished." A user living in Alton may, for example, start with "A for Apple". This audio input is received (step 510) and the system then checks to see whether the end of the word (EOW) has been reached (step 520). Ie whether the caller has pressed the hash key. Note, the invention is not limited to the use of the hash key to denote the end of the input. The caller may, for example, be prompted to say "STOP" or "END". In this case, input is passed to a large vocabulary voice recognition (VR) engine (step 530) first and then step 520 is performed to check whether EOW has been reached.

According to the preferred embodiment, if the system determines that the caller has finished spelling out a word, then step 510 will have received an EOW DTMF tone rather than audio input. Upon receipt of this, the complete string is spelt out to the caller (step 580) and they may confirm that their input has been recognised correctly. This playback to the caller may utilise the ICAO to typify the corresponding letters. For example, if the caller has said "A for apple, L for lemon, T for telephone O for orange N for nut",the system may verify the input by playing the prompt "Let me confirm what I heard. Your input was A for Alpha, L for Lima, T for Tango, O for Oscar, N for November is that correct?" This embodiment allows the voice prompts for the whole voice response application to be pre-recorded by a single artist, providing for a more pleasing implementation with better usability, and negates the need to implement text-to-speech capabilities to repeat with a computer generated voice the actual words the caller spoke. If a mistake has been made the caller is asked to start again (step 550). In an alternative embodiment, confirmation is requested after each individual letter and the caller re-prompted if necessary. According to the preferred embodiment, if confirmation that the whole string is correct is provided then the method proceeds onto the next action to be performed by the voice processing system (step 600). This may, for example, be to retrieve some information from the caller based on the input.

If the system determines at step 520 that the EOW has not been reached, then the audio input is passed to the VR engine (step 530). In the preferred embodiment, the VR engine returns the elements "letter" "for" "word. The system only proceeds to the next step if it determines that each of the three elements have been recognised. If this is not the case, then the caller is prompted to provide the audio input again (step 550).

If recognition is successful then the audio input is verified at step 560. This involves checking that the single alphabetic character and the first letter of the recognised word are the same. If they are not (eg "A for Banana") then the caller is re-prompted for input (step 550). If a match is achieved at step 560 then the system indicates the successful recognition of the current character and the first character of the input is accepted (step 570). In the preferred embodiment, this indication is via a short audible sound (eg a beep) and in the example the accepted character would be "A".

The system then waits to receive more audio input (step 510), for example "L for Lemon". The process repeats itself until the whole string has been spelt out in the fashion described and the hash key pressed.

Alternative embodiments of the present invention do not require that all three elements "letter","for" and "word" are recognised in order for an alphabetic character to be accepted. In one embodiment step 530 is adapted such that if either the letter or the word are recognised, but not both, then the letter or first character of the word, as appropriate, is accepted. This approach does not however provide the double verification of the method above (ie the use of two elements to determine the current letter being spelt out) and thus could lead to inaccuracies.

Greater accuracy may be achieved by proceeding only if the single letter is distinct enough to be recognised by itself. In this approach, the application stores a list of letters which sound similar to one another and hence may cause ambiguities (eg M and N). A letter is considered distinct enough if it does not appear on this list. For example, the system may recognise "C for",but not be sure what the spoken word is. "C" however is a fairly distinctive sound by itself, therefore won't appear on the list. Hence, the system is able to accept this letter as input without re-prompting the caller unnecessarily.

Another possibility is to have the VR engine return a plurality of likely alternatives for the audio input provided, with each letter/word assigned a probability. The more likely a word or letter corresponds to the audio input provided, the higher the probability assigned to it. If, for example, the VR engine provides a choice of letters, and one of them matches the first letter of the word, then the system will accept this letter rather than the other alternatives provided. The system may hear "x for Music" and be undecided as to what "x" is. It may suggest either "M" or "N". However, because "Music" begins with the letter "M",the system can deduce that "x" refers to the letter "M" and accept this. In another approach, the caller is specifically requested to choose the correct alternative from a list provided or reject all alternatives and start again.

A further possibility is for the speech recognition system to accept as input a word only, such that the first character of the word corresponds to the character being spelt out. For example, a caller living on the Isle of Skye may spell out Sausage Kingfisher Yacht Elephant. Again, this approach does not provide the double check of using two elements to determine the alphabetic character. Furthermore, it is not particularly natural for the caller.

Note, the prompt played at step 550 may be tailored according to the current set of circumstances. It may prompt for different word associations etc. For example, the caller may respond with "A for Actor" instead of "A for Apple". The caller may also be transferred at this point to a human agent after a predetermined number of failures.

In another embodiment, the system stores a history of previous unsuccessful match attempts. In this way it can identify any repeated inconsistencies and make an educated guess. For example, if the system recognises the following: "D for Banana" then step 560 fails and the caller is re-prompted (step 550). If on a subsequent try "D for Bat" is recognised, the system can determine that it is mishearing the letter element. It can also deduce that the caller is actually saying the letter "B", since the associated word consistently begins with that letter.

Although the invention has been described in the context of a system for accepting alphabetic characters spelling out a word, the invention is not limited to such. A caller may, for example, be prompted for a catalogue reference comprising a series of alphabetic characters. Alternatively, a caller may be prompted for alphanumeric input. (For example, postcodes throughout the UK comprise both numbers and letters.) The alphabetic characters are dealt with as in the preferred embodiment described above. However, the method is modified slightly when a number is received by the VR engine. Step 540 is adapted to check whether the numeral is recognised. The caller is re-prompted for input if it isn't via step 550. If step 540 is successful then the numeral itself is accepted and the method continues with step 570.

It is important to note that the present invention does not require modification to the standard voice processing system itself. Rather an application is written to run on top of the VR engine and to implement the invention.

In addition, although the speech recognition system of the present invention has been described in terms of a telephony environment, it is not so limited. For example, it might be included in an automatic kiosk which provides local information in response to spoken input questions within Voice over IP (VoIP) internet-based solutions, or an in-car navigation and control unit. It will therefore be recognised that the system of the present invention may find utility in a great variety of speech recognition applications.

What is claimed is:

1. A method of performing speech recognition to determine a particular alphabetic character, comprising the steps of:
    a) receiving acoustic spoken input comprising a single alphabetic character and a word associated with the single character such that the first character of said word is intended to be the same as said single alphabetic character;
    b) processing said acoustic input by using a large speech vocabulary recognition system to recognise said single alphabetic character and said word;
    c) determining the first character of said recognised word;
    d) comparing the recognised single alphabetic character with the determined first character of said recognised word;
    e) responsive to said recognised single alphabetic character being the same as said first character of the recognised word, accepting said character as the determined alphabetic character for the spoken input; and
    f) wherein responsive to only the single alphabetic character in said spoken input being recognised in said processing step, accepting said recognised single character as said determined alphabetic character.

2. The method of claim 1, further comprising the step of maintaining a list of unambiguous alphabetic characters and only accepting said recognised single character as said determined alphabetic character if said single character appears on said list.

3. Apparatus for performing speech recognition to determine a particular alphabetic character, comprising:
    a) means for receiving acoustic spoken input comprising a single alphabetic character and a word associated with the single character such that the first character of said word is intended to be the same as said single alphabetic character;
    b) a large speech vocabulary recognition system for processing said acoustic input for recognising said single alphabetic character and said word;
    c) means for determining the first character of said recognised word;
    d) means for comparing the recognised single alphabetic character with the determined first character of said recognised word;
    e) means, responsive to said recognised single alphabetic character being the same as said first character of the recognised word, for accepting said character as the determined alphabetic character for the spoken input; and
    f) means, responsive to only the single alphabetic character in said spoken input being recognised by the speech recognition system, for accepting said recognised single character as said determined alphabetic character.

4. The apparatus of claim 3, further comprising means for maintaining a list of unambiguous alphabetic characters and means for only accepting said recognised single character as said determined alphabetic character if said single character appears on said list.

* * * * *